UNITED STATES PATENT OFFICE.

OSCAR FALKE, OF NEW YORK, N. Y.

IMPROVED HARD-RUBBER COMPOUND.

Specification forming part of Letters Patent No. 35,599, dated June 17, 1862.

*To all whom it may concern:*

Be it known that I, OSCAR FALKE, of New York, in the county and State of New York, have invented a new and useful Improvement in the Manufacture of Gutta-Percha and India-Rubber Fabrics; and I do hereby declare that the following is a full and exact description thereof.

In a patent granted this present year (1860) to A. C. Richard and myself we claim using sulphuret of antimony and sulphite of soda in a peculiar manner in vulcanizing rubber fabrics; but the product made in accordance with that patent has a very objectionable odor, especially whenever the article becomes warm by use or wear or whenever it is exposed to a process of polishing or rubbing. Since the issue of said patent I have made many and varied expensive experiments to produce from the same materials a hard vulcanite completely inodorous, and I have finally obtained a hard vulcanite which has no offensive smell; but this new result is produced by proceeding in a manner substantially different from that set forth in the said patent of Falke and Richard.

My invention consists in a new article of manufacture or improved hard vulcanite produced by a peculiar mixture and treatment of sulphuret of antimony, sulphite of soda, and india-rubber, gutta-percha, or other vulcanizable gums, the same having no offensive odor. I take the india-rubber or gutta-percha after it has been washed and cleansed and grind the same between steam-heated rollers in the manner well known to manufacturers of rubber fabrics. Then I take ten parts of this ground rubber or gutta-percha and mix the same with twelve parts of sulphuret of antimony and two parts of the sulphite of soda. In order to give a certain color or to increase the bulk of the article or mixture, other ingredients may be added, as lamp-black or whiting; but these last-mentioned ingredients are not necessary to my improvement and form no part of my invention. After rubber or gutta-percha is thoroughly mixed with the other ingredients the compound is passed between heated calender-rollers in order to spread the same into sheets. These sheets are cut up and covered either with metal sheets or placed in molds according to the form or smoothness desired, (and in the manner well known to manufacturers,) and are then subjected to the curing process. In my improved process I employ a heat of 270° Fahrenheit at first, and increase the temperature five degrees each successive hour. The heat is continued according to the result desired, but never for a shorter time than two hours. In this manner I have succeeded in producing a hard vulcanite having no offensive odor, and which could not have been made according to our patent above mentioned. The proportions of the ingredients may be varied a little, yet I prefer those above mentioned. Sometimes to the pound of gutta-percha or india-rubber I have taken two or three ounces of shellac or free sulphur, (less free sulphur, it will be observed, than the lowest proportion claimed by Nelson Goodyear for the purpose of producing hard compound,) and the result which I then obtained was also good.

I am aware that various salts of sulphur acid having less oxygen than sulphuric acid, and especially sulphuret, carbonate, and protoxide of lead, also sulphuret and hyposulphite of zinc with steam or hot water, have been used in vulcanizing india-rubber. Therefore I do not claim the use of any of these. Neither do I claim the curing of india-rubber as described in the patent of Charles Goodyear, reissued December 25, 1849. I also disclaim the making of hard-rubber compound according to the Nelson Goodyear patent, reissued 1858—viz., by mixing one pound of india-rubber with from four ounces to sixteen ounces of sulphur. Likewise I disclaim the proportions and the curing heat claimed by Austin G. Day's patent, reissued November 9, 1858; and I do not broadly claim the use of the combination of sulphuret of antimony and sulphite of soda, but limit my claim to the particular use above described when the proportions of the ingredients and the advantages arising therefrom differ essentially from those of the patent of Richard and myself, above mentioned. I make no claim in regard to the temperature, but confine myself to the new result or improved hard vulcanite made from the ingredients specified. I believe such vulcanite having no offensive odor is new and an improvement upon any manufacture heretofore known.

In the above-described process I have employed artificial sulphuret of antimony; but I propose to use the natural sulphuret in case it will answer the same purpose.

Having thus fully described my invention, what I claim, and desire to secure by Letters Patent of the United States, is—

The above-described improved hard vulcanite as a new article of manufacture, when the same is made substantially in the manner and for the purposes set forth.

OSCAR FALKE.

Witnesses:
 DARIUS BANKS,
 J. AUERLEART.